(12) United States Patent
Elsner et al.

(10) Patent No.: US 6,780,281 B1
(45) Date of Patent: Aug. 24, 2004

(54) STRAND EVAPORATOR

(75) Inventors: Thomas Elsner, Düsseldorf (DE); Jürgen Heuser, Krefeld (DE); Christian Kords, Krefeld (DE); Klemens Kohlgrüber, Kürten (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/130,757

(22) PCT Filed: Nov. 17, 2000

(86) PCT No.: PCT/EP00/11468
§ 371 (c)(1),
(2), (4) Date: May 22, 2002

(87) PCT Pub. No.: WO01/39856
PCT Pub. Date: Jun. 7, 2001

(30) Foreign Application Priority Data
Nov. 29, 1999 (DE) .......................... 199 57 458

(51) Int. Cl.⁷ .............................. B01D 1/08; B01D 3/06; C08F 6/00; C08F 6/10
(52) U.S. Cl. ...................... 159/2.1; 159/27.4; 159/43.1; 159/47.1; 159/DIG. 10; 159/DIG. 15; 528/501
(58) Field of Search .......................... 159/2.1, DIG. 15, 159/27.4, 43.1, 47.1, DIG. 10; 520/501; 203/88, 86, 39; 202/237, 267.1; 527/483; 528/501

(56) References Cited

U.S. PATENT DOCUMENTS

| | | | | |
|---|---|---|---|---|
| 3,849,232 A | * | 11/1974 | Kessler et al. ............. | 159/13.2 |
| 4,294,652 A | | 10/1981 | Newman ..................... | 159/2 R |
| 4,863,568 A | | 9/1989 | Wijn ........................ | 202/185.2 |
| 4,934,433 A | | 6/1990 | Aboul-Nasr ............... | 159/43.1 |
| 5,024,728 A | | 6/1991 | Morita et al. .............. | 159/27.4 |
| 5,684,125 A | | 11/1997 | Nooren ...................... | 527/483 |
| 5,904,807 A | * | 5/1999 | Ramm-Schmidt et al. | 159/43.1 |
| 6,124,426 A | * | 9/2000 | Sugimoto et al. ........... | 528/480 |
| 6,338,774 B1 | * | 1/2002 | Lehman ...................... | 202/83 |

* cited by examiner

Primary Examiner—Virginia Manoharan
(74) Attorney, Agent, or Firm—Joseph C. Gil; Aron Preis

(57) ABSTRACT

A strand devolatilizer that includes a degassing container, a product inlet, a product distributor, a product outlet and a vapor outlet is disclosed. The product distributor is in the form of a tube distributor with at least one distributor tube (1) and a plurality of die tubes (2) arranged in parallel, each containing a plurality of apertures (15) in the tube wall. The die tubes (2) are preferably arranged in several planes one above the other and staggered laterally relative to one another.

20 Claims, 4 Drawing Sheets

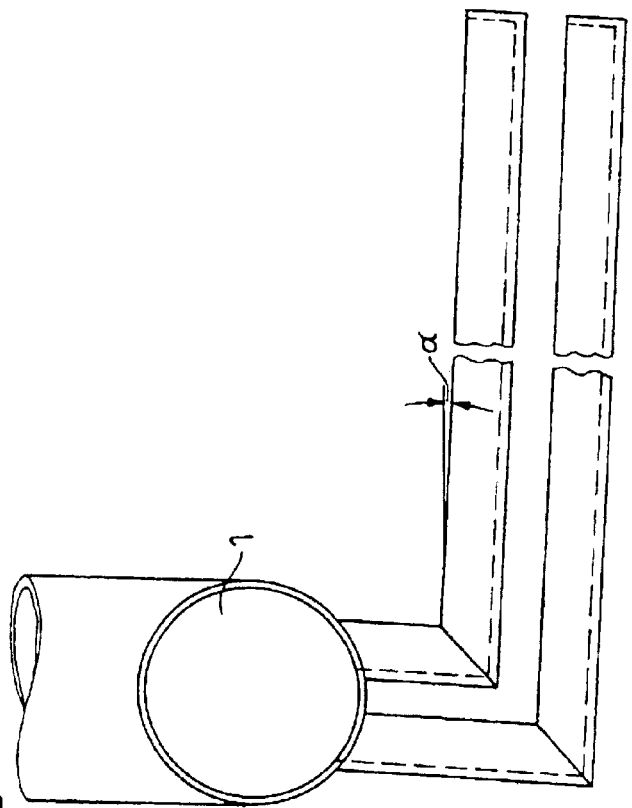
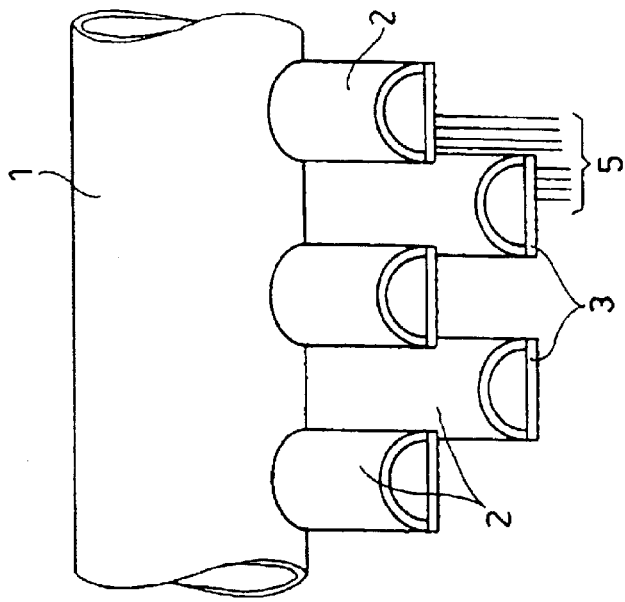
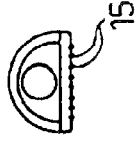

STRAND EVAPORATOR

The invention relates to a strand devolatiliser having a degassing container, a product inlet with at least a distributor tube, a product distributor, a product outlet and a vapour outlet.

Such strand devolatilisers are used in particular in polymer production, to remove the volatile constituents from the product stream (see for example R. J. Albalak, "Polymer Devolatilization", Marcel Dekker Inc., 1996, p. 8). With them, it is attempted to subdivide the heated product stream (e.g. liquefied polymer, falling) into as many (polymer) strands as possible inside the degassing container, in order to achieve as large as possible a surface area. Thin strands allow more strands to be accommodated per unit area. Strand length and thus the height of the degassing container should remain within reasonable limits, however.

In experimental installations and installations with relatively small throughput, it is sufficient to distribute the product stream by means of a so-called plate distributor, in which a perforated plate beneath the product inlet ensures subdivision of the product stream into the individual strands. Strand devolatilisers with plate distributors are known for example from patent specifications U.S. Pat. Nos. 5,024,728 and 4,934,433. On a small scale, only a small plate diameter is required for accommodating the drill holes, only a small plate thickness therefore being necessary for strength reasons even in the event of a high initial product pressure (i.e. in the event of high throughput, high product viscosity) for uniform product distribution over the perforated plate. However, on an industrial scale the diameter of the perforated plates must be very considerable owing to the necessary initial product pressure, in order reliably to prevent sagging thereof. However, a relatively large plate diameter requires longer drill holes in the perforated plate, such that the initial product pressure increases to still higher values, which in turn have an effect on the necessary plate thickness. Owing to the restricted product throughput in the case of plate distributors, a strand devolatiliser provided with such a plate distributor cannot be enlarged however desired, in particular high polymer throughputs (>10 t/h) are not possible for most polymers with their typically high melt viscosity.

A further disadvantage of the strand devolatiliser design with plate distributor is the arrangement of the vapour outlet, which can only be to the side owing to the continuous product distribution plate, whereby strand deflection may arise.

The object of the invention is therefore to design and further develop an above-stated strand devolatiliser described previously in more detail in such a way that, in particular in large manufacturing plants, optimum loading density (product throughput per unit area) is achieved. Moreover, it is desirable for the device to exhibit high flexibility with regard to product throughput and choice of materials.

This object is achieved according to the invention by a strand devolatiliser device which comprises at least a degassing container, a product inlet, a product distributor, a product outlet and a vapour outlet, characterised in that the product distributor takes the form of a tube distributor with at least one distributor tube and a plurality of die tubes arranged in parallel, which comprise a plurality of apertures in the tube wall. The die tubes are preferably arranged in several planes one above the other and staggered relative to one another.

In the strand devolatiliser, a number of product strands corresponding to the number of apertures forms after passage of the (optionally preheated) product stream through the tube distributor and the outlet of the die tubes, which strands fall freely as a result of gravity and collect in the base area of the container.

The arrangement according to the invention of the individual tubes in the degassing container may result in optimally uniform and dense distribution of the product strands over the cross section of the container, such that the volume of the degassing container may be fully utilised. In particular, there are also advantages for vapour conduction, since the volatile constituents of the product stream may be drawn off above the product outlet without any constructional effort and thus the risk of strand deflection by lateral discharge may be eliminated. The height-staggered tubes according to the preferred embodiment allow the volatile constituents to flow upwards counter to the falling strands and in the edge area of the container.

This may also be achieved in that the die tubes are spaced laterally, irrespective of whether they are arranged in a single plane or in several superposed planes.

Alternatively, the individual tubes may exhibit a (circular) round or oval cross section with in each case downwardly directed apertures (e.g. drill holes). Depending on the geometric circumstances in the strand devolatiliser, however, a combination of these and other tube shapes mentioned below may also be appropriate.

According to further preferred teaching of the invention, the individual tubes take the form of half-tubes, which are each bounded at the bottom by an especially flat perforated plate. In this way, virtually the entire diameter of the half-tubes may be utilised for strand formation.

Due to the small width of an individual half-tube or an oval tube compared with the diameter of a conventional plate distributor, the plate thickness of the half-tubes or wall thickness of the oval tubes necessary for strength reasons may be considerably smaller than the plate thickness in conventional plate distributors.

According to a further preferred development of the invention, other tube shapes are provided instead of the half-tubes, which other tube shapes do not necessarily exhibit a round cross section, For example, a triangular or rectangular cross section may be produced from thick-walled sheets or drawn profiles.

Another particular development of the invention provides that the die tubes are arranged inclined to the horizontal, in particular sloping towards their ends, at an angle $\alpha$ of up to 15°, in particular 10°, in order to ensure drainage of the tubes if the product supply is cut off.

According to other preferred teaching of the invention, the die tubes are fitted directly on the distributor tube of the product inlet, so that no dead spaces arise in the distributor tube. The connection may be achieved by welding or detachable fastening, e.g. by means of flange and screws.

Another particular development of the invention provides that the ends (tips) of the die tubes are made acute-angled by bevelling, in order to minimise dead space at the tube end.

In a further particularly preferred development of the invention, provision is made for the product distributor to comprise a plurality of distributor tubes, which are arranged in the degassing container, such that subdivision of the product stream into substreams proceeds inside the degassing container. The distributor tube may extend in curved manner in the inner upper area of the degassing container. Such an "internal distributor" has the advantage that only a single tube has to pass into the degassing container for product feed, such that it is ensured that the device is vacuum-tight.

However, it is also possible for the product distributor to comprise a plurality of distributor tubes located outside the degassing container, such that subdivision of the product stream into substreams proceeds outside the degassing container. This alternative development has the advantage that, where necessary, an individual blocked tube may be replaced with less effort than in the case of "internal distributors". However, this advantage is won at the cost of the disadvantage of more complex sealing (vacuum resistance).

To achieve optimum product quality, therefore, the first alternative, i.e. the "internal distributor" is preferred for many applications.

To avoid the risk of blockage, in particular in the case of non-steady state operation, a further particular development of the invention provides that the die tubes of the tube distributor are provided with additional heating tubes. This development also has considerable advantages with regard to product quality, since, as is of importance in polycarbonate manufacture for example, the temperature may be reduced in the preliminary stage due to the fact that the energy input necessary for heating the polycarbonate stream to the degassing temperature may be "left to the last minute". This product-protective pretreatment improves the colour of such polymers and thus product quality.

To this end, a further preferred development of the invention provides that the heating tubes take the form of half-tubes, optionally with a smaller diameter than the die tubes, and are fitted on the die tubes from above. Although such a development is constructionally relatively complex, this increased effort may be easily compensated for by the attendant advantages. Instead of the attached half-tubes, other cross sections may also be used, in particular those with an oval cross section.

All components which come into contact with the product stream, in particular the degassing container or the product distributor, may be made of any desired material. However, these components are preferably made of a low-iron material with an iron content of at most 10%, if, for example, iron-catalysed, heat-induced decomposition of the product arises, as has been observed in the case of polycarbonate. All components which come into contact with the product are particularly preferably made of alloys such as Alloy 59 (2.4605), Inconell 686 (2.4606), Alloy-B2, Alloy-B3, Alloy-B4, Alloy-C22, Alloy-C276, Alloy-C4 or Alloy 625. In the case of heated product distributors, materials with high heat conductivity are particularly preferred.

A preferred embodiment of the strand devolatiliser is characterised in that the apertures are arranged in a plurality of parallel rows along the die tubes, wherein adjoining rows exhibit centre spacing of 1.0 to 20 mm, preferably 2.0 to 10 mm.

The adjoining rows of apertures are particularly preferably arranged staggered relative to one another along the length of the tube.

In a particular advantageous embodiment of the strand devolatiliser, the adjoining apertures in a row exhibit centre spacing of 1.5 to 20 mm, preferably 2 to 10 mm.

The diameter of the apertures amounts preferably to from 0.1 to 10 mm, particularly preferably from 0.5 to 5 mm, very particularly preferably from 1 to 3 mm.

The apertures are preferably drilled in the die tubes. The drill holes are preferably so formed that the surface roughness of the drill holes is not too great, i.e. the roughness value $R_a$ is at most 12.5 μm. Roughness categories N6 to N9 according to ISO 1302 have proven particularly favourable for the drill holes.

An important factor in producing a stable polymer strand is the preferred deflashing of the drill hole ends. With many polymers, countersinking of the drill holes at the outlet is particularly advantageous. The countersinking angle is preferably in the range of from 60 to 120°. A countersinking angle of approximately 90° is particularly preferred. The countersinking depth is preferably 0.2 to 2 times the drill hole diameter.

In the case of very long (length/diameter=30) die tubes, the pressure gradient along the tube is negative in its effect, since the throughput through the apertures decreases in the polymer flow direction. Although an increase in die tube diameter renders uniform the different throughputs through the apertures along the tube, it results in a longer product dwell time, with the attendant risk of thermal product damage.

In a particularly preferred embodiment, therefore, the die tubes are provided with apertures with enlarged diameters in the direction of polymer flow, in order to achieve widely constant throughput per aperture.

In another preferred embodiment, the throughput through the apertures along the die tubes is rendered uniform by providing a different number of apertures per unit length of the die tube. A reduction in the number of drill holes in the flow direction of the polymer leads to a reduction in the pressure gradient along the die tubes and thus throughput per aperture is rendered uniform. This prevents the throughput at individual apertures from becoming so low, in the case of low total throughput through the device, that the polymer filaments exiting at the apertures tear off. This would lead to a reduction in degassing performance.

The strand devolatiliser according to the invention may be used to remove volatile constituents from solutions of any liquid or meltable polymers and like substances.

Apart from the solvent, the volatile constituents may comprise both non-polymerised monomers or oligomers and other low-molecular weight educts.

The invention further provides use of the strand devolatiliser according to the invention for removing volatile constituents, in particular solvents and/or monomers or oligomers, from melts or solutions of heat-sensitive substances, in particular of polymers, medicinal substances, natural materials or foodstuffs.

The strand devolatiliser according to the invention is preferably used for degassing thermoplastic polymers. These polymers comprise all plastics which become free-flowing under the influence of pressure and heat. Examples of these are polycarbonate, polystyrene, polyphenylene sulfide, polyurethane, polyamide, polyester, polyacrylate, polymethyl(meth)acrylate, SAN resin and copolymers thereof as well as possible mixtures of the polymers.

BRIEF DESCRIPTION OF THE DRAWINGS

The invention is described in more detail below with reference to Figures provided merely as illustrations of exemplary embodiments. In these Figures:

FIG. 1 is a schematic, cross-sectional, perspective representation of the arrangement of the die tubes of the tube distributor, FIG. 1a shows the end of a die tube, FIG. 2 shows a variant of the tube distributor of FIG. 1, in side view.

EXAMPLES

Figure 6:
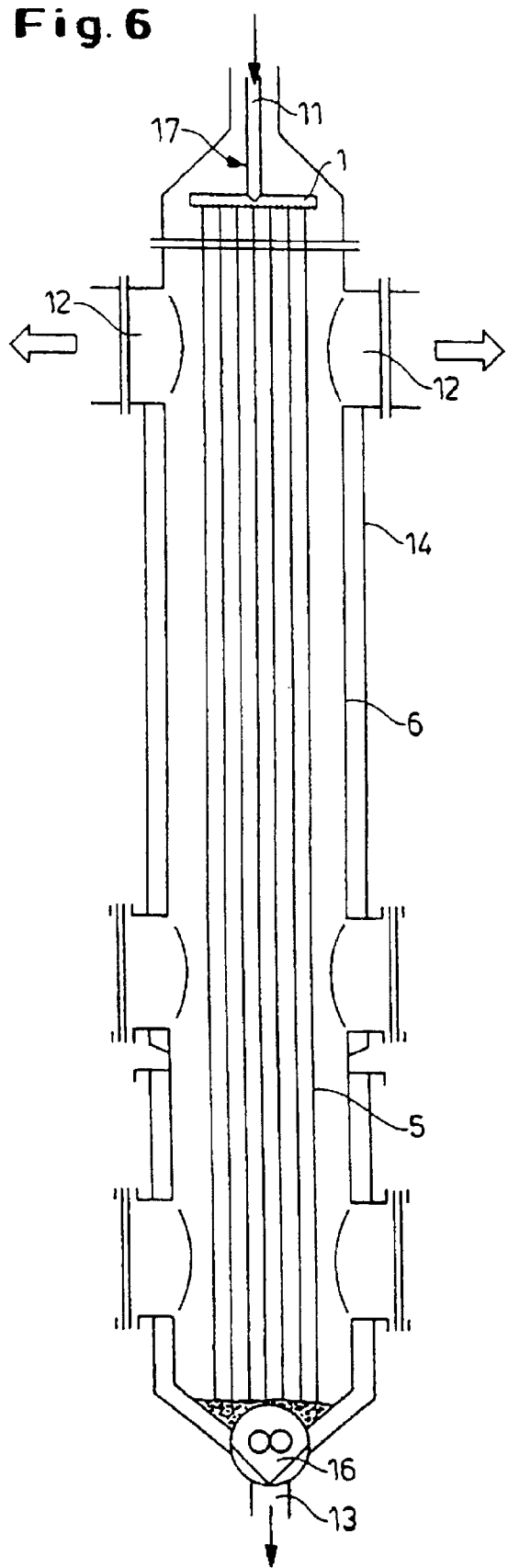
FIG. 6 shows a schematic longitudinal section through the entire strand devolatiliser arrangement.
Figure 7:
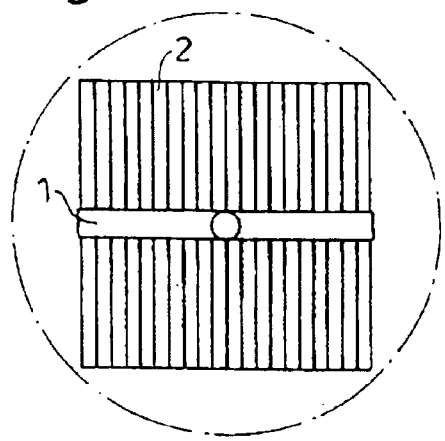
FIG. 7 shows a cross section through the strand devolatiliser according to FIG. 6.

FIG. 7 shows a cross-sectional view of a strand devolatiliser. Product flows through the product inlet 11 to the product distributor 17 consisting of distributor tube 1 and the die tubes 2 branching out therefrom (see FIG. 6). The product stream exits from the apertures 15 in the die tubes 2 (see FIGS. 1 and 1a), forms falling strands 5 and collects at the base of the degassing container 6. A pump 16 conveys the degassed product in the direction of the product outlet 13. Outlets 12 for volatile constituents are fitted in the upper lid of the degassing container 6. The casing of the degassing container takes the form of a heating jacket 14. In this embodiment, the die tubes are arranged next to one another in a single plane (see FIGS. 6 and 7).

The product distributor of the strand devolatiliser is shown schematically in FIG. 1, wherein the product stream is fed through a distributor tube 1 to a plurality of individual die tubes 2 opening into the distributor tube 1, which die tubes take the form of half-tubes 2 in the exemplary embodiment shown, which is preferred in this respect, and are closed at the bottom by perforated plates 3. It is quickly apparent that no product dead spaces may arise in the distributor tube 1 because the individual die tubes 2 are fitted directly to the product inlet distributor tube 1. In contrast to the embodiment according to FIG. 7, the die tubes 2 according to FIG. 1 are positioned in staggered arrangement next to one another in two superposed planes.

In the variant of the tube distributor shown in side view in FIG. 2, the die tubes 2 preferably exhibit a slight inclination to horizontal in the direction of their ends and are, moreover, provided with a stopper 4 at their ends (see FIG. 2a).

It is clear from FIG. 1 that the loading density of the tube distributor of the strand devolatiliser is optimised by arranging the individual tubes above one another in a plurality of planes and staggered relative to one another. To provide a better overview, individual strands 5 are indicated only at the bottom right of FIG. 1.

The improved loading density, i.e. the product throughput per unit area, is clearly revealed by the schematic representation in FIGS. 3a to 3d. In an arrangement with external distributor (shown in FIG. 3d), mutually spaced tubes ("lances") 7 are passed through the wall of the degassing container 6, which tubes were nested in one another from two sides in the experimental example.

Figure 3D:
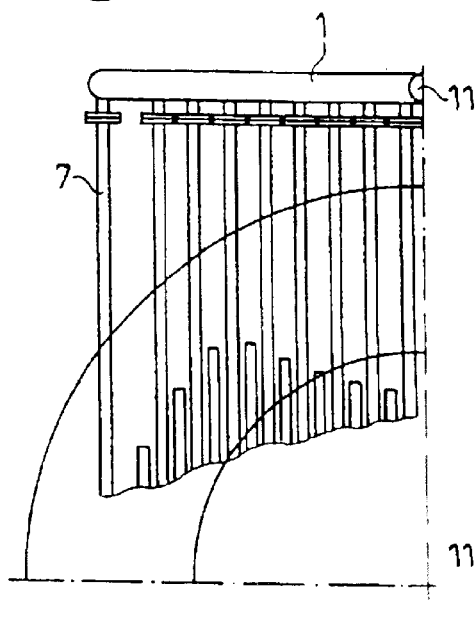
FIGS. 3a–3d are schematic representations of four variants of the die tube arrangement of the strand devolatiliser according to the invention, in each case in cross section.
Figure 3A:
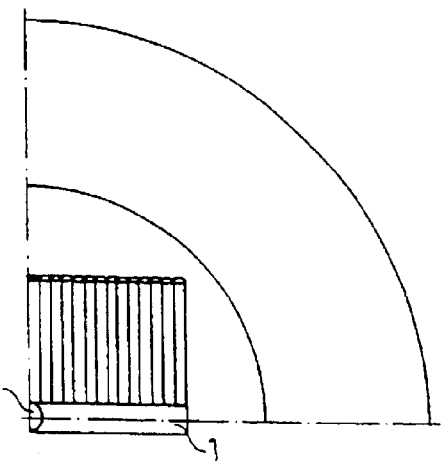
Figure 3C:
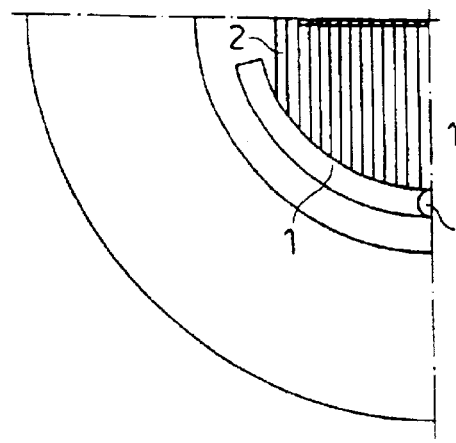

FIG. 3c shows that, in the case of an internal distributor with staggered half-tubes 2, the same number of drill holes may be accommodated over half the diameter. This means that loading (number of drill holes per unit area) is four times as great as in the above-mentioned arrangement. A triangular arrangement of the drill holes allows virtually the densest possible loading. Drill hole spacing of 4 mm results in a minimum diameter of 1130 mm.

Figure 3B:
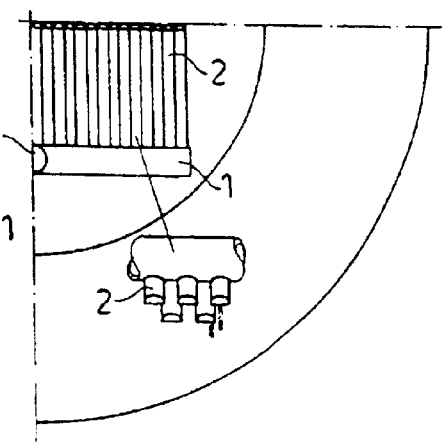

While FIG. 3c shows a curved distributor tube, which requires die tubes 2 of different lengths in the drill hole area and thus different throughputs per tube, FIG. 3b shows a straight distributor tube 1, which results in identical tube lengths and an identical throughput per tube 2. FIG. 3a shows that the tube distributor may have a central distributor tube 1, from which die tubes 2 branch off in two directions.

Figure 5:
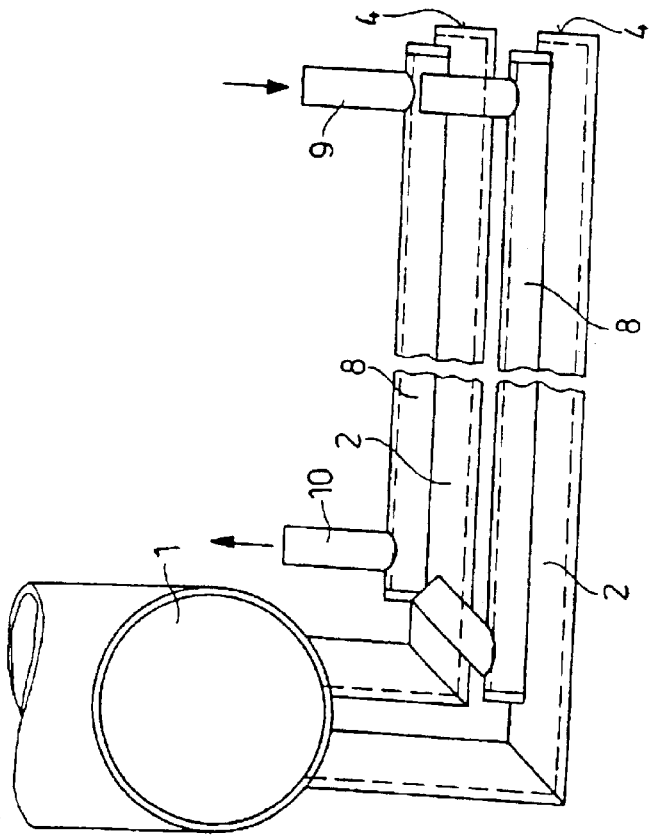
FIG. 5 shows the item from FIG. 2 with heated tubes.
Figure 4:
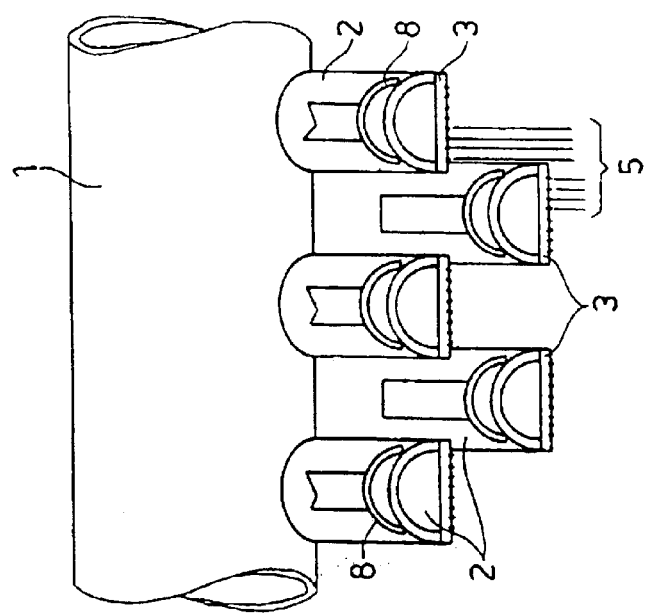
FIG. 4 shows the item from FIG. 1 with heated tubes and FIG. 4a shows the end of a die tube.
Figure 4A:
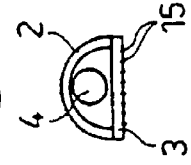

FIGS. 4 and 5 finally show that heating of the tube distributor is also possible. In this case, a heating tube 8 is fitted to each individual half-tube 2, its diameter being slightly smaller than that of the half-tube 2, in order to prevent damage. A heating medium is fed to the individual heating tubes at inlet 9 in the direction of the arrow and drawn off at the outlet 10 along the arrow, such that counter-current heating ensues. Here too, the ends of the half-tubes 2 may be closed with a stopper 4 (FIG. 4a). FIG. 5 shows that, although heating the individual half-tubes 2 by means of individual heating tubes 8 entails considerable constructional effort, the possibility of gentle product treatment and a marked improvement in product quality makes this effort justified.

The strand devolatiliser according to the invention results, owing to the particular structure of the tube distributor, in a high loading density and extremely high flexibility with regard to product throughput and choice of materials. Since the individual tubes may be prefabricated without difficulty, further advantages result with regard to manufacturing effort and materials availability. As already stated, optimum vapour conduction may also be achieved, since, with the arrangement according to the invention of the individual tubes, the volatile constituents may be drawn off above the product outlet without constructional effort.

PRACTICAL EXAMPLE

A styrene-containing SAN copolymer with a content of approx. 2000 ppm of volatile compounds (styrene, acrylonitrile, ethylbenzene (solvent)) is evaporated in a strand devolatiliser according to FIG. 6. At a product temperature of 220° C., a viscosity of over 1000 Pa.s. is obtained. A tube distributor according to FIG. 6 or FIG. 7 with half-tubes (as in FIG. 1a) located in a single plane is used. The half-tube plate 3 constituting the bottom closure comprises a wall thickness of 25 mm. The drill holes 15 are stepped, tapering from 3 to 2 mm. In the area where the drill hole diameter is 3 mm, the average peak-to-valley height $R_a$ is 3.0 μm, while, in the area where the drill hole diameter is 2 mm (at the outlet), the average peak-to-valley height $R_a$ is 1.6 μm. The drill hole ends are deflashed and countersunk. In a strand devolatiliser with 6 m long polymer filaments and at a throughput of approx. 100 g per hour and drill hole, a residual volatile compound content in the degassed product of 100 ppm is obtained.

What is claimed is:

1. A strand devolatiliser device for removing volatile constituents from any liquid or molten polymers comprising a degassing container (6), a product inlet, a product distributor, a product outlet and a vapor outlet, wherein the product distributor is in the form of a tube distributor with at least one distributor tube (1) and a plurality of die tubes (2) in the form of half tubes, each tube having a wall, and each tube bounded at its bottom by a flat perforated plate arranged in parallel, which comprise a plurality of apertures (15) in the tube wall.

2. A strand devolatiliser according to claim 1, wherein the plurality of die tubes (2) exhibit an oval or circular cross section and in each case comprise downwardly directed drill holes as apertures (15).

3. A strand devolatiliser according to claim 1, wherein the die tubes (2) take the form of triangular or rectangular profiles, which are each bounded at the bottom by said perforated plate.

4. A strand devolatiliser according to claim 1, wherein the die tubes (2) are inclined at an angle α to horizontal of up to 15°.

5. A strand devolatiliser according to claim 1, wherein the die tubes (2) are closed and bevelled at their free ends.

6. A strand devolatiliser according to claim 1, wherein the die tubes (2) are fitted directly on the at least one distributor tube (1) of the product inlet.

7. A strand devolatiliser according to claim 1, wherein the product distributor comprises a plurality of distributor tubes (1), which are arranged inside the degassing container (6).

8. A strand devolatiliser according to claim 1, wherein the product distributor comprises a plurality of distributor tubes (1), which are arranged outside the degassing container (6).

9. A strand devolatilisor according to claim 1, wherein the die tubes (2) of the tube distributor are provided with heating tubes (8).

10. A strand devolatiliser according to claim 1, wherein the components of the strand devolatiliser which come into contact with the liquid or molten polymers consist of a low-iron material with an iron content of at most 10%.

11. A strand devolatiliser according to claim 10, wherein the material is selected from the group consisting of Alloy-B2, Alloy-B3, Alloy-B4, Alloy-C22, Alloy-C276, Alloy-C4 and Alloy 625.

12. A strand devolatiliser according to claim 1, wherein the apertures (15) are arranged in a plurality of parallel rows (16) along the die tubes (2), wherein the adjoining rows (16, 16') exhibit center spacing of 1.0 to 20 mm.

13. A strand devolatiliser according to claim 12, wherein the adjoining rows (16, 16') of apertures (15) are arranged staggered relative to one another along the length of the tube.

14. A strand devolatiliser according to claim 13, wherein the adjoining apertures (15) in a row (16) exhibit center spacing of 1.5 to 20 mm.

15. A strand devolatiliser according to claim 1, wherein the diameter of the apertures (15) amounts to from 0.1 to 10 mm.

16. A strand devolatiliser according to claim 1, wherein the apertures are drilled, in that the apertures (15) are deflashed at the ends and/or in that the apertures (15) are countersunk at their outlet to the degassing container (6).

17. A strand devolatiliser according to claim 16, wherein the apertures exhibit a peak-to-valley height $R_a$ of at most 12.6 $\mu$m.

18. A method of using a strand devolatilizer comprising removing volatile constituents from liquid or molten polymers, said devolatilizer comprising a degassing container (6), a product inlet, a product distributor, a product outlet and a vapor outlet, wherein the product distributor is in the form of a tube distributor with at least one distributor tube (1) and a plurality of die tubes in the form of half tubes each having a wall arranged in parallel, which comprise a plurality of apertures (15) in the tube wall.

19. A strand devolatilizer device for removing volatile constituents from any liquid or molten polymers comprising a degassing container (6), a product inlet, a product distributor, a product outlet and a vapor outlet, wherein the product distributor is in the form of a tube distributor with at least one distributor tube (1) and a plurality of die tubes (2) each having a wall and each in the form of half tubes which are bounded at the bottom by a flat perforated plate are arranged in parallel, which comprise a plurality of apertures (15) in the tube wall, and wherein the die tubes (2) are arranged in several planes one above the other and staggered laterally relative to one another.

20. A strand devolatilizer device for removing volatile constituents from any liquid or molten polymers comprising a degassing container (6), a product inlet, a product distributor, a product outlet and a vapor outlet, wherein the product distributor is in the form of a tube distributor with at least one distributor tube (1) and a plurality of die tubes each having a wall arranged in parallel, which comprise a plurality of apertures (15) in the tube wall, and wherein the die tubes (2) of the tube distributor are provided with heating tubes (8) in the form of half-tubes that are fitted on the die tubes (2) from above.

* * * * *